US010031438B2

(12) United States Patent
Wakabayashi et al.

(10) Patent No.: US 10,031,438 B2
(45) Date of Patent: Jul. 24, 2018

(54) ELECTROPHOTOGRAPHIC MEMBER, DEVELOPING APPARATUS AND IMAGE FORMING APPARATUS

(71) Applicant: CANON KABUSHIKI KAISHA, Tokyo (JP)

(72) Inventors: Kazuhito Wakabayashi, Susono (JP); Minoru Ito, Susono (JP); Tomoya Uesugi, Susono (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 172 days.

(21) Appl. No.: 15/194,828

(22) Filed: Jun. 28, 2016

(65) Prior Publication Data

US 2017/0010562 A1 Jan. 12, 2017

(30) Foreign Application Priority Data

Jul. 9, 2015 (JP) ................................ 2015-138018

(51) Int. Cl.
*B32B 9/04* (2006.01)
*G03G 15/08* (2006.01)

(52) U.S. Cl.
CPC ................................ *G03G 15/0808* (2013.01)

(58) Field of Classification Search
CPC ................................................... C08K 5/5435
See application file for complete search history.

(56) References Cited

U.S. PATENT DOCUMENTS

| | | | |
|---|---|---|---|
| 8,059,997 | B2 | 11/2011 | Otake et al. |
| 8,372,570 | B2 | 2/2013 | Matsuda et al. |
| 8,377,549 | B2 | 2/2013 | Takayama et al. |
| 8,401,425 | B2 | 3/2013 | Kuroda et al. |
| 8,447,214 | B2 | 5/2013 | Tomomizu et al. |
| 8,469,867 | B2 | 6/2013 | Kuroda et al. |
| 8,501,325 | B2 | 8/2013 | Tomomizu et al. |
| 8,523,748 | B2 | 9/2013 | Nagamine et al. |
| 8,546,051 | B2 | 10/2013 | Otake et al. |
| 8,628,846 | B2 | 1/2014 | Wakabayashi et al. |
| 8,755,714 | B2 | 6/2014 | Nagamine et al. |
| 8,792,810 | B2 | 7/2014 | Ito et al. |
| 8,837,985 | B2 | 9/2014 | Ishida et al. |
| 8,846,287 | B2 | 9/2014 | Yamada et al. |
| 9,017,239 | B2 | 4/2015 | Ishida et al. |
| 9,026,012 | B2 | 5/2015 | Otake et al. |
| 2013/0130022 | A1 | 5/2013 | Uesugi et al. |

FOREIGN PATENT DOCUMENTS

JP 2012-83595 A 4/2012

OTHER PUBLICATIONS

Templin (Adv. Mater., 9(10) (1997) 814-817).*

* cited by examiner

*Primary Examiner* — Kuo Liang Peng
(74) *Attorney, Agent, or Firm* — Fitzpatrick Cella Harper and Scinto

(57) ABSTRACT

The present invention provides an electrophotographic member which can prevent generation of fogging while high quality images can be output during long-term use. The present invention is an electrophotographic member including a substrate, and an outermost layer directly or indirectly on the substrate, wherein the outermost layer contains a compound having at least a Si—O—Al bond, and the compound has a structural unit represented by Formula (1) and a structural unit represented by $AlO_{3/2}$.

Formula (1)

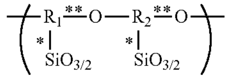

6 Claims, 2 Drawing Sheets

ELECTROPHOTOGRAPHIC MEMBER, DEVELOPING APPARATUS AND IMAGE FORMING APPARATUS

BACKGROUND OF THE INVENTION

Field of the Invention

The present invention relates to an electrophotographic member, a developing apparatus and an image forming apparatus using electrophotography.

Description of the Related Art

Users of image forming apparatuses using electrophotography have demanded formation of electrophotographic images less degradable after long-term use and a small change over time in the quality of the formed electrophotographic images. To produce such high quality electrophotographic images, preventing adhesion of toners to non-image portions (hereinafter, referred to as "fogging") is essential. The term "fogging" indicates a phenomenon in which a developer is charged to a charging polarity opposite to that to which the developer is originally charged, so that the developer adheres to non-image portions which should not be developed. The developer charged to the polarity opposite to that to which the developer is originally charged is hereinafter also referred to as "reversal developer."

To prevent such "fogging," the developing member should have high charging properties to prevent generation or a reversal developer, and have a high electric resistance such that the charge of the charged developer is not decayed until development. To prevent "fogging," the charging member should have charging properties such that after completion of the transfer step, the reversal polarity of the reversal developer remaining on the photosensitive member can be charged to the original polarity to return the developer from the photosensitive member to the developing unit. These properties of the charging member are particularly useful in photosensitive members having no cleaning mechanism. In such photosensitive members having no cleaning mechanism, all of the developer remaining on the photosensitive, member without being transferred passes through the charging member, and cannot be returned to the developing unit. As result, the residual developer is unintentionally disposed on the non-image portions in the next developing step to generate fogging.

To meet the requirements on the developing member and the charging member described above, the developer adhering to the surfaces of these members is an obstacle in demonstration of the effects to be provided by these members. For this reason, high lubrication is also required to prevent adhesion of the developer to the surfaces of these members. Japanese Patent Application Laid-Open No. 2012-83595 discloses a developing member including a surface layer including a compound having a Si—O—Sr bond or a Si—O—Ta bond to have a dense crosslinked structure and have high lubrication.

SUMMARY OF THE INVENTION

One aspect of the present invention is directed to providing an electrophotographic member which can prevent generation of fogging while high quality images can be output during long-term use.

Another aspect of the present invention is also directed to providing a developing apparatus and an image forming apparatus which enable formation of high quality electrophotographic images.

According to one aspect of the present invention, there is provided an electrophotographic member comprising: a substrate; and an outermost layer directly or indirectly disposed on the substrate, wherein the outermost layer contains a compound having at least a Si—O—Al bond, and the compound has a structural unit represented by Formula (1); and a structural unit represented by Formula (2):

Formula (1)

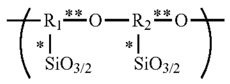

Formula (2)

$AlO_{3/2}$ where $R_1$ and $R_2$ each independently represent one of Formulae (3) to (6):

Formula (3)

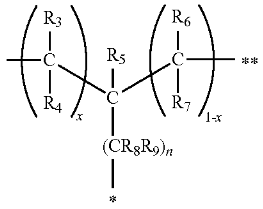

Formula (4)

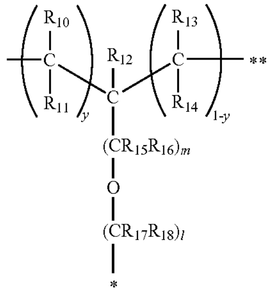

Formula (5)

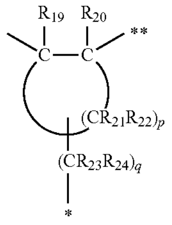

Formula (6)

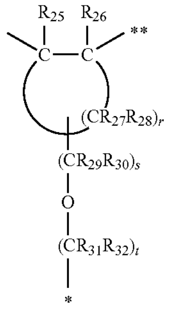

where $R_3$ to $R_7$, $R_{10}$ to $R_{14}$, $R_{19}$, $R_{20}$, $R_{25}$ and $R_{26}$ each independently represent hydrogen, an alkyl group having 1 to 4 carbon atoms, a hydroxyl group, a carboxyl group, or an amino group; $R_8$, $R_9$, $R_{15}$ to $R_{18}$, $R_{23}$, $R_{24}$ and $R_{29}$ to $R_{32}$ each independently represent hydrogen or an alkyl group having 1 to 4 carbon atoms; $R_{21}$, $R_{22}$, $R_{27}$ and $R_{28}$ each independently represent hydrogen, an alkoxyl group having 1 to 4 carbon atoms, or an alkyl group having 1 to 4 carbon atoms; n, m, l, g, s and t each independently represent an integer of 1 or more and 8 or less; p and r each independently represent an integer of 4 or more and 12 or less; x and y each independently represent 0 or 1; and * and ** represent a position of bonding to a silicon atom and a position of bonding to an oxygen atom in Formula (1), respectively.

According to another aspect of the present invention, there is provided a developing apparatus comprising the electrophotographic member as a developing member, and an image forming apparatus comprising the developing apparatus.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The present inventors, who have conducted research, have found that the developing member described in Japanese Patent Application Laid-Open No. 2012-83595 does not have sufficient charging properties to the developer, and is still susceptible to improvement.

The present inventors have conducted further research to solve the problems of the developing member described in Japanese Patent Application Laid-Open No. 2012-83595.

As a result, the present inventors have found that a layer containing a compound having an alumina structure having high charging properties in the structure has high charging properties to the developer and a high electric resistance, thus preventing decay of the charge of the charged developer. The present inventors have also found that because the layer has polymer structure derived from a siloxane structure, the layer has a surface having high lubrication to efficiently prevent fusing of the developer. The present invention has been made based on such knowledge.

[Electrophotographic Member]

The electrophotographic member can be used in an image forming apparatus using electrophotography. Specifically, the electrophotographic member can be suitably used as a developing member for developing a latent image formed on a photosensitive member drum to form an apparent image or a charging member brought into contact with a photosensitive member drum to charge the photosensitive member. The electrophotographic member can also be used as a transfer member, an antistatic member or conveying member. The electrophotographic member according to the present invention can have a shape such as a roller or a belt.

Figure 1:
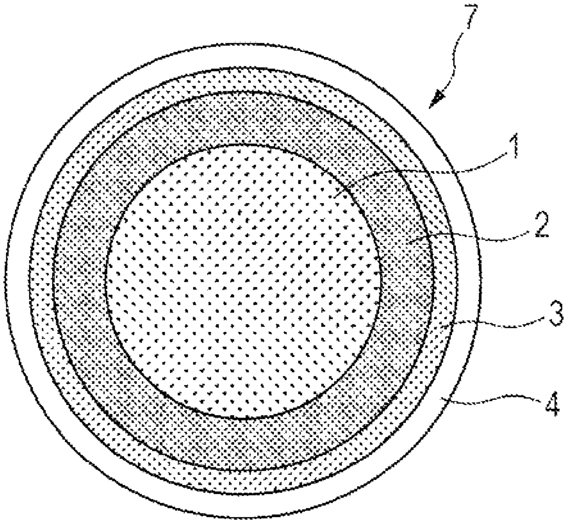
FIG. 1 is a schematic configurational view illustrating an example of the developing member according to the present invention.
Figure 2:
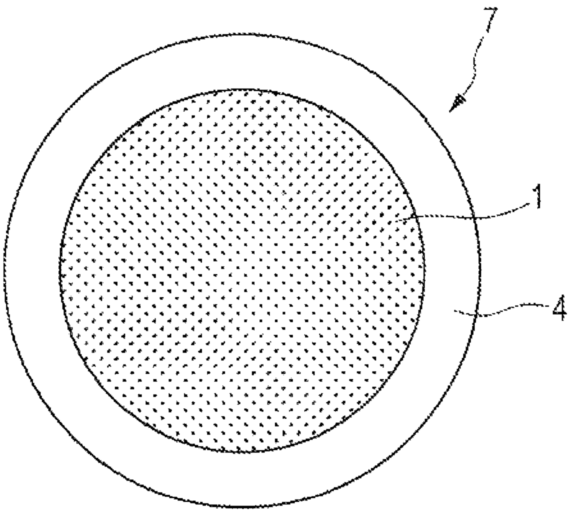
FIG. 2 is a schematic configurational view illustrating another example of the developing member according to the present invention.

A developing member in the form of a roller will now be described as an embodiment of the electrophotographic member according to one aspect of the present invention, but the use of the present invention will not be limited to this embodiment. As illustrated in FIG. 1 or FIG. 2, the developing member according to the present invention includes a substrate, and an outermost layer formed on the outer periphery of the substrate directly or with another layer being interposed therebetween.

[Substrate]

The substrate functions as an electrode and a support member for the developing member. The substrate includes a conductive material such as a metal or an alloy such as aluminum, a copper alloy or stainless steel, iron plated with chromium or nickel, or a synthetic resin having conductivity.

[Another Layer]

The developing method used in the electrophotographic apparatus is mainly classified into two a contact developing method of performing development while the developing member is brought into contact with the photosensitive member drum, and a non-contact developing method of performing development only by the action of an electric field while the developing member is spaced several hundred micrometers from the photosensitive member drum. The contact developing method suitably uses a developing member including a substrate, and an outermost layer formed on the outer periphery of the substrate with another layer being interposed therebetween, while the non contact developing method suitably uses a developing member including a substrate, and an outermost layer directly formed on the outer periphery of the substrate. Examples of another layer include elastic Layers and layers having irregular surfaces.

[Elastic Layer]

The elastic layer gives the developing member elasticity needed to form a nip having a predetermined width n the contact region between the developing member and the photosensitive member drum. The elastic layer can be usually formed of a molded rubber product. Examples of the rubber material include the following: ethylene-propylene-diene copolymerization rubber (EPDM), acrylonitrile-butadiene rubber (NBR), chloroprene rubber (CR), natural rubber (NR), isoprene rubber (IR), styrene-butadiene rubber (SBR), fluorocarbon rubber, silicone rubber, epichlorohydrin rubber, NBR hydrides and urethane rubber. These rubber materials can be used singly or in combinations of two or more.

Among these rubber materials, particularly silicone rubber is preferred because compression set of the elastic layer is unlikely to be caused while another member (such as a developer regulating blade) is brought into contact with the developing member for a long period of time. Examples of the silicone rubber include cured products of addition curable silicone rubbers. Furthermore, cured products of addition curable dimethyl silicone rubbers are particularly preferred because these cured products have high adhesiveness to the surface layer described later.

The elastic layer appropriately contains a variety of additives such as a conductive agent, a non-conductive filler, a conductive filler, a crosslinking agent and a catalyst. Examples of usable conductive agents include nanoparticles of carbon black, conductive metals such as aluminum and copper, and conductive metal oxides such as zinc oxide, tin oxide and titanium oxide. Among these conductive agents, carbon black is particularly preferred because carbon black is relatively easily available and provides high conductivity. In use of carbon black as a conductive agent, 2 to 50 parts by mass of carbon black is compounded in 100 parts by mass of the rubber material. Examples of the non-conductive filler include silica, quartz powder, titanium oxide, zinc oxide or calcium carbonate. Examples of the crosslinking agent include di-t-butyl peroxide, 2,5-dimethyl-2,5-di(t-butylperoxy)hexane or dicumyl peroxide.

[Layer Having Irregular Surface]

A layer having an irregular surface provides irregularities of the outermost surface of the developing member to carry a necessary amount of the developer on the surface of the developing member. This layer having an irregular surface can be disposed in a developing member having such a thin outermost layer described later that irregularities are difficult to have on the surface of the outermost layer, for example.

Irregularities are suitably formed with spherical particles. The spherical particles can have a volume average particle sire of 3 to 20 μm. Examples of the spherical particles include nanoparticles of polyurethane resins, polyester resins, polyether resins, polyamide resins, acrylic resins and phenolic resins.

Examples of a resin for binding the spherical particles for forming irregularities include the following resins:

phenolic resins, epoxy resins, polyamide resins, polyester resins, polycarbonate resins, polyolefin resins, silicone resins, fluorine resins, styrene resins, vinyl resins, cellulose resins, melamine resins, urea resins, polyurethane resins, polyimide resins and acrylic resins.

The layer having an irregular surface can contain conductive particles to adjust the volume resistance of the outermost layer. Examples of conductive particles suitably used include particles of the following materials:

metal powders of aluminum, copper, nickel and silver;

metal oxides such as antimony oxide, indium oxide, and tin oxide; and carbon products such as carbon fibers, carbon black and graphite.

[Outermost Layer]

The outermost layer contains a compound having at least a Si—O—Al bond. The compound has a structural unit represented by Formula. (1) and a structural unit represented by Formula (2):

Formula (1)

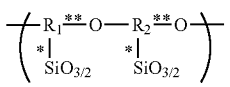

Formula (2)

$AlO_{3/2}$ where $R_1$ and $R_2$ each independently represent one of Formulae (3) to (6):

Formula (3)

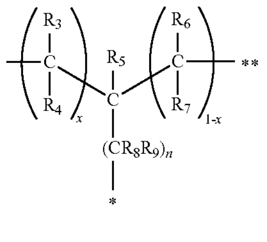

-continued

Formula (4)

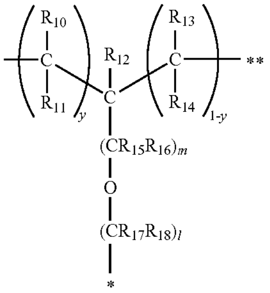

Formula (5)

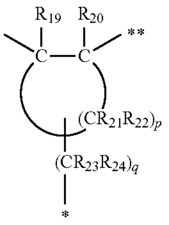

Formula (6)

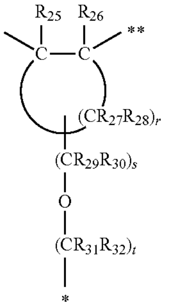

where $R_3$ to $R_7$, $R_{10}$ to $R_{14}$, $R_{19}$, $R_{20}$, $R_{25}$ and $R_{26}$ each independently represent hydrogen, an alkyl group having 1 to 4 carbon atoms, a hydroxyl group, a carboxyl group, or an amino group; $R_8$, $R_9$, $R_{15}$ to $R_{18}$, $R_{23}$, $R_{29}$ to $R_{32}$ each independently represent hydrogen or an alkyl group having 1 to 4 carbon atoms; $R_{21}$, $R_{22}$, $R_{27}$ and $R_{28}$ each independently represent hydrogen, an alkoxyl group having 1 to 4 carbon atoms, or an alkyl group having 1 to 4 carbon atoms; n, m, l, q, s and t each independently represent an integer of 1 or more and 8 or less; p and r each independently represent an integer of 4 or more and 12 or less; x and y each independently represent 0 or 1; and * and ** represent a position of bonding to a silicon atom and a position of bonding to en oxygen atom in Formula (1), respectively, In the compound, $R_1$ and $R_2$ in Formula (1) can be each independently one of structures represented by Formulae (7) to (10). In this case, the organic chain present in the compound can control the elastic modulus of the outermost layer or the fragility or flexibility of the outermost layer as film properties. In particular, an ether site can be present in the structure of the organic chain because such an ether site can enhance the close adhesion of the outermost layer to the elastic layer, Formula (7)

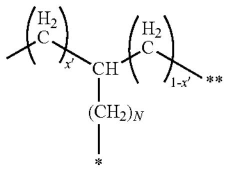

Formula (8)

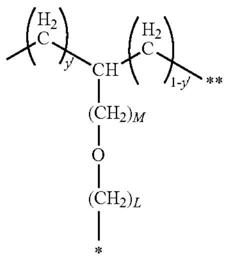

Formula (9)

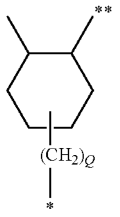

Formula (10)

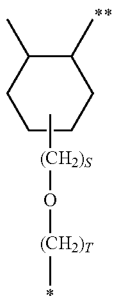

where N, M, L, Q, S and T each independently represent an integer of 1 or more and 8 or less; x' and y' each independently represent 0 or 1; * represents a position of bonding to a silicon atom in Formula (1); and ** represents a position of bonding to an oxygen atom.

Part of the structure of an exemplary compound is represented by Formula (11) where $R_1$ in Formula (1) is a structure represented by Formula (3), and $R_2$ is a structure represented by Formula (4):

Formula (11)

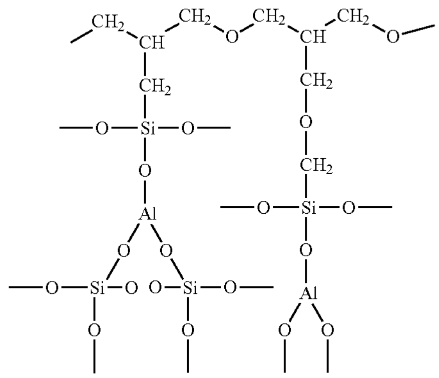

The compound has an organic chain portion and an Al—O—Si bond in the molecule. This suggests that the compound has a very dense cross linked structure. This dense crosslinked structure increases the electric resistance of the compound to prevent the flow of charges from the surface of the outermost layer of the developing member to the inside of the developing member. For this reason, the charges of the charged developer can readily stagnate on the surface of the developing member to prevent decay of the charges on the developing member until development on the photosensitive member is performed.

A range of the volume resistivity of the outermost layer can be $10^{10}$ Ω·cm or more and $10^{10}$ Ω·cm or less. A volume resistivity within this range can retain the charges of the developer on the surface of the developing member to effectively prevent fogging.

The compound contains aluminum as a metal element. Aluminum has much higher charging ability to the developer than those of strontium and tantalum, which are the metal elements contained in the traditional compounds. Presence of aluminum in the compound significantly enhances the charging ability to the developer, leading to prevention of generation of the reversal developer and a reduction in fogging.

Furthermore, the compound has an organosiloxane structure having an organic group in the siloxane bond. Such an organosiloxane structure: can enhance lubrication of the compound to reduce the coefficient of friction of the surface of the developing member. The enhanced lubrication of the compound can prevent fusing of the developer to the developing member during long-term use to provide stable charging properties.

The atomic ratio Al/Si of aluminum to silicon contained in the compound can be 0.10 or more and 12.5 or less. An atomic ratio in this range can sufficiently provide charging properties as an effect derived from aluminum and high lubrication derived from the siloxane structure.

The outermost layer containing the compound can have a thickness of 0.1 μm or more and 10.0 μm or less. If the outermost layer has a thickness such that particles for forming irregularities can be kept, the particles for forming irregularities can be added to the outermost layer to form irregularities on the surface of the outermost layer.

[Method of Producing Compound Used Outermost Layer]

Examples of the method for producing a compound include, a method including the following steps (1) to (3):

Step (1): step of preparing a hydrolyzed condensate through a hydrolysis reaction and a condensation reaction;

Step (2): step of adding a photopolymerization initiator to solution containing the hydrolyzed condensate to prepare a coating material for forming an outermost layer; and Step (3) step of forming a coating of a coating material for forming an outermost layer, and curing the hydrolyzed condensate through crosslinking to generate a compound.

These steps (1) to (3) will now be sequentially described.

Step (1)

A first hydrolyzable silane compound represented by Formula (12), a second hydrolyzable silane compound represented. Formula (13), a hydrolyzable aluminum compound represented by Formula (14), water, and alcohol are refluxed with heating to prepare a reaction solution of the hydrolyzed condensate, i.e., a product of the hydrolysis condensation reaction. The second hydrolyzable silane compound represented by Formula (13) is used as an optional component rather than an essential component:

$R_{33}$—Si—$(OR_{34})_3$ Formula (12)

$R_{33}$—Si—$(OR_{36})_3$ Formula (13)

Al—$(OR_{37})_3$ Formula (14)

In Formula (12), $R_{33}$ represents one of structures represented by Formulae (15) to (18) having a cationically polymerizable group which can form crosslinking through irradiation with active energy beams; $R_{34}$ represents an alkyl group having 1 to 4 carbon atoms; and three $R_{34}$ present in Formula (12) may be the same or different in the same compound:

Formula (15)

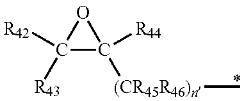

Formula (16)

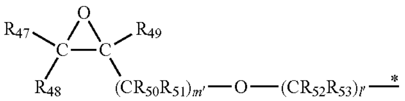

Formula (17)

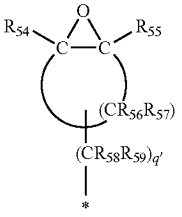

Formula (18)

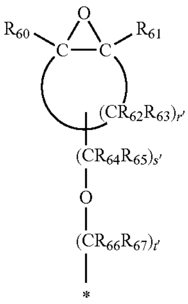

where $R_{42}$ to $R_{44}$, $R_{47}$ to $R_{49}$, $R_{54}$, $R_{55}$, $R_{60}$ and $R_{61}$ each independently rev,resent hydrogen, an alkyl group having 1 to 4 carbon atoms, a hydroxyl group a carboxyl group, or an amino group; $R_{45}$, $R_{46}$, $R_{50}$ to $R_{53}$, $R_{54}$, $R_{59}$ and $R_{64}$ to $R_{67}$ each independently represent hydrogen or a linear or branched alkyl group having 1 to 4 carbon atoms; $R_{56}$, $R_{57}$, $R_{62}$ and $R_{63}$ each independently represent hydrogen, an alkoxyl group having 1 to 4 carbon atoms, or a linear or branched alkyl group having 1 to 4 carbon atoms; $CR_{45}R_{46}$, $CR_{50}R_{51}$, $CR_{52}R_{53}$, $CR_{58}R_{59}$, $CR_{64}R_{65}$ and $CR_{66}R_{67}$ may be a carbonyl group; at least any two carbons of the carbons in $R_{42}$, $R_{43}$, $R_{44}$ and $(CR_{45}R_{46})$n' and at least any two carbons of the carbons in $R_{47}$, $R_{48}$, $R_{49}$ and $(CR_{50}R_{51})$m' may together form a cycloalkane; $R_{54}$ and $R_{55}$, or $R_{60}$ and $R_{61}$ may together form a cycloalkane; n', m', l', q', s' and t' each independently represent an integer of 1 or more and 8 or less; p' and r' each independently represent an integer of 4 or more and 12 or less; * represents a position of bonding to a silicon atom in Formula (12); n', m', l', s' and t' each independently represent an integer of 1 or more and 8 or less; and p' and r' each independently represent an integer of 4 or more and 12 or less.

Specific examples of a usable first hydrolyzable silane compound represented by Formula (12) include the following: 4-(1,2-epoxybutyl)trimethoxysilane, 5,6-epoxyhexyltriethoxysilane, 8-(oxiran-2-yl)octyltrimethoxysilane, 8-(oxiran-2-yl)octyltriethoxysilane, 3-glycidoxypropyltrimethoxysilane, 3-glycidoxypropyltriethoxysilane, 1-(3,4-epoxycyclohexyl)ethyltrimethoxysilane, 1-(3,4-epoxycyclohexyl)ethyltriethoxysilane, 3-(3,4-epoxycyclohexyl)methylocypropyltrimethoxysilane and 3-(3,4-epoxycyclohexyl)methyloxypropyltriethoxysilane.

The second hydrolyzable silane compound represented by Formula (13) enhances the solubility of the hydrolyzable compound represented by Formula (12) or Formula (14) during the hydrolysis condensation reaction, the applicability of the hydrolyzed condensate, and electrical properties of the cured product of the hydrolyzed condensate.

In Formula (13), $R_{35}$ represents an alkyl group having 1 to 4 carbon atoms or a phenyl group; and $R_{36}$ represents an alkyl group having 1 to 6 carbon atoms. Three $R_{36}$ present in Formula. (13) may be the same or different in one compound. In particular, if $R_{35}$ is an alkyl group, the hydrolyzable compound has high solubility and applicability. If $R_{35}$ a phenyl group, the cured product the hydrolyzed condensate has enhanced electrical properties, particularly volume resistivity. If a hydrolyzable silane compound where $R_{35}$ is a phenyl group is contained, such a hydrolyzable silane compound can be used in combination with a hydrolyzable silane compound where $R_{35}$ has an alkyl group because the resulting product has high miscibility with the solvent even if the structure of the compound is changed through the hydrolysis condensation reaction.

Specific examples of a usable second hydrolyzable silane compound represented by Formula (13) include the following: methyltrimethoxysilane, methyltriethoxysilane, methyltripropoxysilane, ethyltrimethoxysilane, ethyltriethoxysilane, ethyltripropoxysilane, propyltrimethoxysilane, propyltriethoxysilane, propyltripropoxysilane, hexyltrimethoxysilane, hexyltriethoxysilane, hexyltripropoxysilane, decyltrimethoxysilane, decyltriethoxysilane, decyltripropoxysilane, phenyltrimethoxysilane, phenyitriethoxysilane and phenyltripropoxysilane.

In the hydrolyzable: aluminum compound represented by Formula (14), $R_{37}$ represents an alkyl group having 1 to carbon atoms. Three $R_{37}$ present in the same formula may be the same or different. Specific examples of a usable hydrolyzable aluminum compound represented by Formula (14) include aluminum isopropoxide and aluminum methoxide.

The amount of water (W mol) used in the hydrolysis condensation reaction of the hydrolyzable compound is preferably within the range of 0.20 or more and 3.0 or less in terms of the molar ratio W/Z where the total number of moles of the hydrolysis sites of the hydrolyzable compound present in the reaction system is defined as Z mol. The value of W/Z is more preferably 0.40 or more and 2.0 or less. At a value of W/Z of 0.20 or more, the condensation reaction can be sufficiently performed to prevent non reacted monomers from being left. At a value of W/Z of 3.0 or less, the condensation reaction can be appropriately controlled, and the miscibility between the hydrolyzable compound and alcohol can be enhanced. Open-ring of the epoxy ring in Formula (12) can be prevented. A reduction in miscibility between the reaction product and alcohol can prevented, preventing generation cloudiness or precipitation.

The alcohol used in the hydrolysis condensation reaction of the hydrolyzable compound is used to make the hydrolyzed condensate of the hydrolysis condensation reaction miscible. Alcohols that can be used are primary alcohols, secondary alcohols, tertiary alcohols, mixtures of primary alcohols and secondary alcohols, or mixtures of primary alcohols and tertiary alcohols In particular, ethanol, a mixture of methanol and 2-butanol, and a mixture of ethanol and 2-butanol can be used because of high solubility of the hydrolyzable compound used. A mixture of these hydrolyzable compounds can be appropriately heated to promote the hydrolysis condensation reaction. A reaction solution containing a hydrolyzed condensate as a reaction product can be thus prepared.

Step (2)

In Step (2), a photopolymerization initiator is added to the reaction solution containing the hydrolyzed condensate prepared in Step (1) to prepare a coating material for forming an outermost layer.

Photopolymerization initiators can be those which can more efficiently perform crosslinking of the hydrolyzed condensate through irradiation with light. A photopolymerization initiator that can be used is a cationic polymerization initiator. For example, an epoxy group has high reactivity to onium salts of Lewis acids activated with active energy beams. Accordingly, if the cationically polymerizable group is an epoxy group, an onium salt of a Lewis acid can be used as the cationic polymerization initiator. Other examples of the cationic polymerization initiator include borates, compounds having an imide structure, compounds having a triazine structure, azo compounds, and peroxides.

Among a variety of cationic polymerization initiators, aromatic sulfonium salts and aromatic iodonium salts can be used from the viewpoint of sensitivity, stability and reactivity. In particular, bis(4-tert-butylphenyl)iodonium salts and a compound having a structure represented by Formula (19) (trade name: ADEKA OPTOMER-SP150, manufactured by Adeka Corporation) can be used. A compound represented by Formula (20) (trade name: IRGACURE 251, manufactured by Ciba Specialty Chemicals) can be suitably used.

Formula (19)

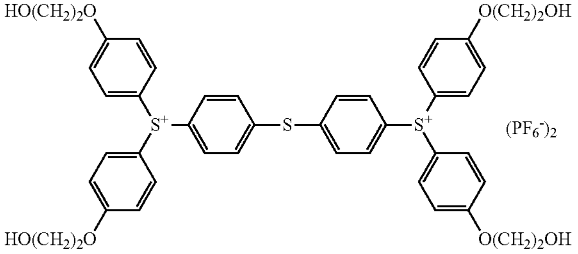

-continued

Formula (20)

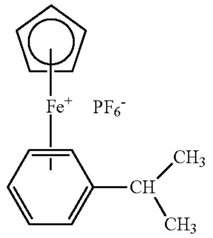

The photopolymerization initiator can be used in an amount in the range of 1.0 part by mass or more and 5.0 parts by mass or less relative to 100 parts by mass of the hydrolyzed condensate prepared from the hydrolyzable compounds represented by Formulae (12) to (14). If the amount of the photopolymerization initiator to be used is 1.0 part by mass or more, curing with ultraviolet light, can be sufficiently performed. If the amount is 5.0 parts by mass or less, the photopolymerization initiator can be easily dissolved in the condensation reaction solution.

Besides, the coating material for forming an outermost layer can contain optional additives such as particles for forming irregularities on the surface of the outermost layer. These additives can be added to the reaction solution containing the hydrolyzed condensate prepared in Step (1), and can be dispersed with a dispersing apparatus such as a ball mill, a sand mill, an attritor or a bead mill, or a dispersing apparatus using a collision method for forming nanoparticles or a thin film spin method.

Step (3)

In Step (3), a coating of the coating material for forming an outermost layer is formed, and the hydrolyzed condensate is cured through crosslinking to generate the compound according to the present invention. The coating can be formed by a known method such as spray coating or coating with a roll coater.

The hydrolyzed condensate is crosslinked in the coating formed through application of the coating material for forming an outermost layer onto the outer periphery of the substrate by the method above directly or with another layer being interposed between the substrate and the coating. Crosslinking can be formed through thermal curing or irradiation with active energy beams. The epoxy ring of which the hydrolyzed condensate has, can be ring-opened through irradiation with energy beams in the presence of the photopolymerization initiator to promote the crosslinking reaction. The compound according to the present invention is generated through the cross linking reaction of the hydrolyzed condensate. The active energy beams that can be used are ultraviolet light because ultraviolet light can generate radicals of the photopolymerization initiator at low temperature: to promote the crosslinking reaction. Promotion of the crosslinking reaction at low temperature can prevent rapid volatilization of the solvent from the coating to prevent phase separation or wrinkle of the coating. As a result, an outermost layer having high adhesive strength to the base material can be formed.

Examples of usable, sources for ultraviolet light include high pressure mercury lamps, metal halide lamps, low pressure mercury lamps and excimer UV lamps. Among these light sources, those which feed ultraviolet light having a wavelength of 150 nm or more and 480 nm or less are preferred. Ultraviolet light can be irradiated while the intensity of ultraviolet light to be fed is adjusted according to the irradiation time, the lamp output, and the distance between the lamp and the coating layer. The intensity of ultraviolet light to be irradiated can also be gradient within the irradiation time. The accumulated amount, of ultraviolet, light can be appropriately selected. The accumulated amount of ultraviolet light can be determined from the following expression:

accumulated amount [mJ/cm$^2$] of ultraviolet light=intensity of ultraviolet light [mW/cm$^2$]× irradiation time [s]

If a low pressure mercury lamp is used, the accumulated amount of ultraviolet light can be measured with an accumulated UV meter UIT-150-A or UVD-S254 (both are trade names) manufactured by Ushio Inc. If an excimer UV lamp is used, the accumulated amount of ultraviolet light can be measured with an accumulated UV meter UIT-150-A or VUV-S172 (both are trade names) manufactured by Ushio Inc.

The atomic ratio of Al to Si can be determined as follows: measurement is performed with an energy dispersive X-ray analyzer (manufactured by EDAX Inc.) attached to an electron microscope (trade name: S4800, manufactured by Hitachi, Ltd.) as a measurement apparatus at an accelerating voltage of 10 kV and a take-in time of 100 seconds, and calculation is performed from the atomic percentages (atomic %) of Al and Si.

From measurement by $^{29}$Si-NMR and $^{13}$C-NMR (apparatus used: JMN-EX400, JEOL Ltd.), it can be verified that the compound in the outermost layer has a structure represented by Formula (1), and the hydrolyzable silane compound having an epoxy group is condensed. From the spectrum obtained in the $^{29}$Si-NMR measurement, it is found that Si having a and to an organic functional group at or near −64 ppm to −74 ppm has three bonds to of atoms through O, that is, is in the form of —$SiO_{3/2}$. This finding suggests that the hydrolyzable silane compound is condensed, and is present in the form of —$SiO_{3/2}$. In the spectrum obtained in the $^{1}$C-NMR measurement, the peaks indicating the epoxy group before ring-opening appear at or near 44 ppm and 51 ppm while the peaks ring-opening polymerization appear at or near 69 ppm and 72 ppm. From this, it can be verified that most of epoxy groups are polymerized with little residues of epoxy groups not ring-opened. From the measurement by $^{29}$Si-NMR and $^{13}$C-NMR, it can verified that the compound has a structure represented by Formula (1).

That the compound in the outermost layer has a structural unit represented by Formula (2) can be verified with a scanning X-ray photoelectron spectrometer (apparatus used.: Quantum 2000, manufactured by ULVAC-PHI, INCORPORATED) from appearance of a shoulder peak of Al—O in a low energy as of the main peak of the 1S orbital of the oxygen atom appearing in the range of 525 eV or more and 540 eV or less. The measure or conditions are shown below.

X-ray source: monochromatic AlKα
Diameter of X-ray source: 100 μm (25 W (15 KV))
Photoelectron extraction angle: 45 degrees
Neutralization condition: use of a neutralization gun in combination with an ion gun
Analysis region: 300×1500 μm
Pass energy: 11.75 eV
Step size: 0.05 eV.

[Developing Apparatus and Image Forming Apparatus]

Figure 3:
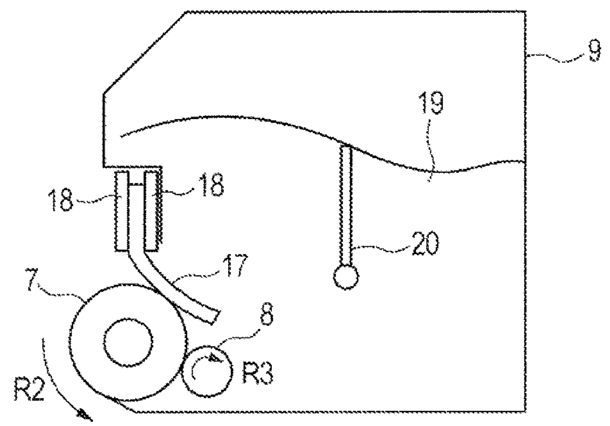
FIG. 3 is a schematic configurational view illustrating an example of a developing apparatus including the electrophotographic member according to the present invention.
Figure 4:
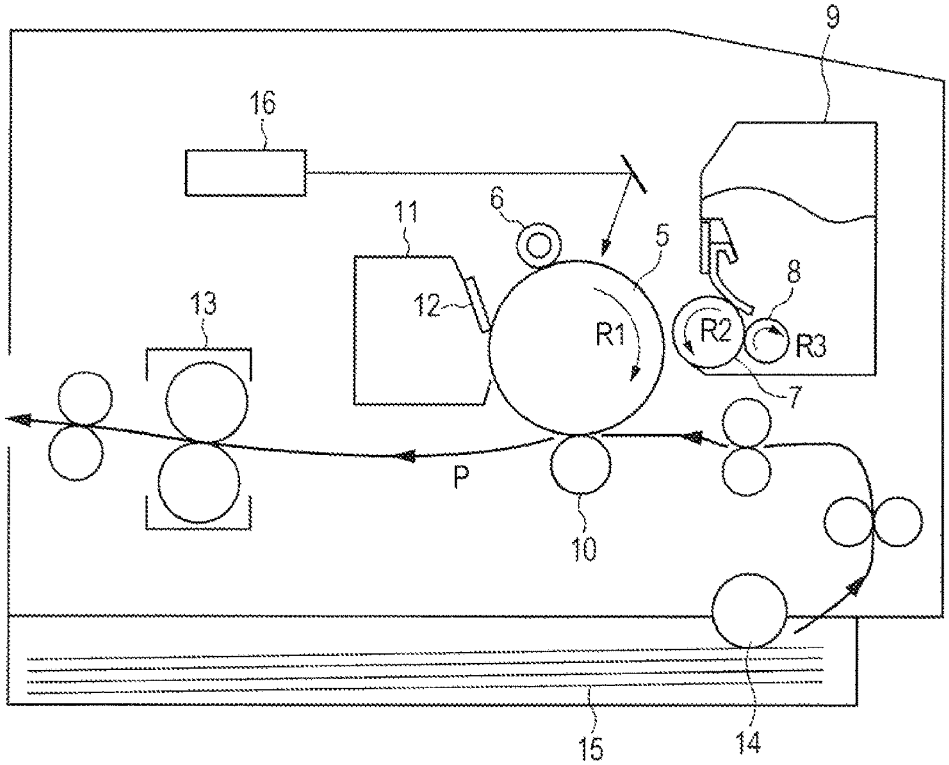
FIG. 4 is a schematic configurational view illustrating an example of an image forming apparatus including the electrophotographic member according to the present invention.

The developing apparatus and the image forming apparatus will be described in detail by way of the drawings, but the present invention will not be limited to these apparatuses. FIG. 3 is a schematic configurational view illustrating an example of a developing apparatus including the electrophotographic member according to the present invention as a developing member. FIG. 4 is a schematic configurational view illustrating en example of an image forming apparatus having the developing apparatus incorporated therein.

In FIG. 3 or FIG. 4, an electrostatic latent image is formed on an electrostatic latent image carrier 5 as an image carrier. The electrostatic latent image carrier 5 is rotated in the direction of Arrow R1. A developing member 7 is rotated in the direction of Arrow R2 to convey a developer 19 to the region to be developed where the developing member 7 faces the electrostatic latent image carrier 5. The developing member is in contact with a developer feeding member 8 to feed the developer 19 onto the surface of the developing member 7.

A charging roller 6, a transfer member (transfer roller) 10, a cleaner container 11, a cleaning blade 12, a fixing unit 13 and a pick-up roller 14 are disposed around the electrostatic latent image carrier 5. The electrostatic latent image carrier 5 is charged by the charging roller 6. The electrostatic latent image carrier 5 is irradiated with laser light from a laser generator 16 to perform exposure. An electrostatic latent image corresponding to the target image is thereby formed. The electrostatic latent image on the electrostatic latent image carrier 5 is developed with a developer in a developing unit 9 to form an image. The image is transferred onto a transfer material (paper) 15 by the transfer member (transfer roller) 10 in contact with the electrostatic latent image carrier 5 through the transfer material. The transfer material (paper) 15 carrying the image is conveyed to the fixing unit 13, and is fixed onto the transfer material (paper) 15. The residual developer 19 on the electrostatic latent image carrier 5 is scraped off with the cleaning blade 12, and is accommodated in the cleaner container 11.

The thickness of the developer layer on the developing member can be controlled by the developing member 7 in contact with a developer regulating member 17 with the developer being interposed therebetween. A typical developer regulating member in contact with the developing member is a regulating blade. The regulating blade can also be suitably used in the present invention.

Examples of usable materials forming the regulating blade include rubber elastic products such as silicone rubber, urethane rubber and NBR; synthetic resin elastic products such as poly(ethylene terephthalate); and metal elastic materials such as phosphor bronze plates and SUS plates. Composites of these materials may be used. Furthermore, the regulating blade can have a structure of a laminate of an elastic support formed of a rubber or synthetic resin elastic product, or a metal elastic material and a charge control material such as a resin, rubber, a metal oxide or a metal to control the charging properties of the developer. In this case, the regulating blade is used such that the portion made of the charge control material corresponds to the contact portion with the developing member. A particularly preferred regulating blade includes a laminate of a metal elastic material and a resin or rubber. Resins and rubber can be those which are readily charged to a positive polarity, such as urethane rubber, urethane resins, polyamide resins and nylon resins.

The electrophotographic member can he used as a developing member in both of the contact developing system of performing development while the electrophotographic member is brought into contact with the photosensitive member drum and the non-contact developing system of performing development while the electrophotographic member is not brought into contact with the photosensitive member drum. Furthermore, the electrophotographic member can also be satisfactorily used as a charging member. The electrophotographic member can also be used as a transfer member, an antistatic member and a conveying member.

One aspect according to the present invention can provide an electrophotographic member which can prevent generation of fogging while high quality images can be output during long-term use. Another aspect according to the present invention can provide a developing apparatus and an image forming apparatus which can form high quality electrophotographic images.

EXAMPLES

The present invention will now be described by way of specific Production Examples, Examples and Comparative Examples. Production Example 1 is Preparative Example of developer A, Production Example 2 is Preparative Example of elastic layer 1, and Production Example 3 is Preparative Example of an intermediate layer roller. Production Examples 11 to 17 are Preparation Examples of hydrolyzed condensate intermediate products C-1 to C-7, and Production Examples 21 to 45 are Preparation Examples of hydrolyzed condensates G-1 to G-25 for an outermost layer.

In Examples 1 to 17, the electrophotographic member according to the present invention is used as a developing member for a contact developing method. In Examples 21 to 24, the electrophotographic member according to the present invention is used as a developing member for a non-contact developing method. In Examples 31 to 34, the electrophotographic member according to the present invention is used as a charging member.

[1. Measurement of Thickness]

The thicknesses or the outermost layer, the elastic layer, and the layer having an irregular surface are measured by the following method. An electrophotographic member cut vertically to the longitudinal direction of the electrophotographic member at three positions in total, that is, positions 20 mm away from both ends in the longitudinal direction and the central position. Subsequently, each cross section is observed with an optical microscope, and the thicknesses of these layers are measured at 10 points at random. The resulting thicknesses from the measurement at 10 points×3 positions are arithmetically averaged, and the value is defined as the thickness.

[2. Measurement of Atomic Ratio of Al to Si]

The atomic ratio of Al to Si is determined as follows: measurement is performed with an energy dispersive X-ray analyzer (manufactured by EDAX Inc.) attached to an electron microscope (trade name: S4800, manufactured by Hitachi, Ltd.) as a measurement apparatus at an accelerating voltage of 10 kV and a take-in time of 100 seconds, and calculation is performed from the atomic percentages (atomic %) of Al and Si.

[3. Measurement of Structure Represented by Formula (1)]

It is verified that the compound in the outermost layer has a structural unit represented by Formula (1), from measurement by $^{29}$Si-NMR and $^{13}$C-NMR (apparatus used: JMN-EX400, JEOL, Ltd.).

[4. Measurement of Structure Represented by Formula (2)]

It is verified that the cc pound in the outermost layer has a structural unit represented by Formula (2), with a scanning X-ray photoelectron spectrometer (apparatus used: Quantum 2000, manufactured by ULVAC-PHI, INCORPORATED).

Production Example 1

Preparation of Developer A

A mixture containing the materials shown in Table 1 below was added dropwise to 200 parts by mass of cumene refluxed (temperature: 148° C. to 156° C.) over 4 hours to complete solution polymerization under refluxing of cumene. Cumene was removed while the system was being heated to 200° C. under reduced pressure.

TABLE 1

| Materials | Parts by mass |
|---|---|
| Styrene | 68 |
| Butyl acrylate | 14 |
| Monobutyl maleate | 10 |
| Di-tert-butyl peroxide | 0.8 |

30 parts by mass of the resulting styrene-acrylic copolymer was dissolved in a mixture of other six materials shown in Table 2 below to prepare a mixed solution.

TABLE 2

| Materials | Parts by mass |
|---|---|
| Styrene-acrylic copolymer | 30 |
| Styrene | 48 |
| Butyl acrylate | 22 |
| Monobutyl maleate | 2 |
| Divinylbenzene | 0.4 |
| Benzoyl peroxide | 0.7 |
| tert-Butylperoxy-2-ethylhexanoate | 0.7 |

0.15 parts by mass of partially saponified product of poly(vinyl alcohol) was dissolved in 170 parts by mass of water to prepare a solution. This solution was added to the mixed solution, and was vigorously stirred to prepare a suspended dispersion liquid. Furthermore, 100 parts by mass of water was added thereto. The suspended dispersion liquid was poured into a reactor purged into a nitrogen atmosphere, and was polymerized at about 80° C. for 8 hours. After polymerization was completed, the product was filtered, was sufficiently washed with water, and was dried by dehydration to prepare binder resin B. In the next step, the materials shown in Table 3 below were mixed in a Henschel mixer, and the mixture was melt kneaded in a biaxial extruder heated to 115° C. This melt kneaded product was cooled, and was then ground with a hammer mill to prepare a developer ground product.

TABLE 3

| Materials | Parts by mass |
|---|---|
| Binder resin B<br>Glass transition temperature (Tg): 63.0° C.<br>Weight average molecular weight (Mw): 13200 | 100 |
| Magnetic substance<br>Weight average particle size: 0.20 μm | 95 |
| Monoazo iron complex<br>(Trade name: T-77, manufactured by HODOGAYA CHEMICAL CO., LTD.) | 1.5 |
| Paraffin<br>Melting point: 76° C. | 4 |

The resulting developer ground product was mechanically pulverized with a turbo mill, and fine particles and coarse particles were classified and removed at the same time with an Elbow-jet classifier using a Coanda effect. Through the steps above, negatively chargeable developer particles having weight average particle size (D4) of 6.5 μm measured by a Coulter Counter method and an average circularity of 0.945 were prepared. In a Henschel mixer, 100 parts by mass of the developer particles was mixed with 1.2 parts by mass of hydrophobic silica fine powder subjected to a treatment with hexamethyldisilazane followed by a treatment with dimethylsilicone oil to prepare developer A.

Production Example 2

Preparation of Elastic Layer 1

Primer (tirade name: DY35-051, manufactured by Dow Corning Toray Ltd.) was applied to a cylindrical aluminum tube ground into an outer diameter of 10 mm and an arithmetic average roughness Ra of 0.2 μm, and was burned to prepare a substrate. This substrate was disposed in a metal mold, and an addition silicone rubber composition containing a mixture of the materials shown in Table 4 below was injected into the cavity formed in the metal mold.

TABLE 4

| Materials | Parts by mass |
|---|---|
| Addition curable liquid silicone rubber material (Trade name: SE6724A/B, manufactured by Dow Corning Toray Co., Ltd.) | 100 |
| Carbon black (Trade name: TOKABLACK #4300, manufactured by Tokai Carbon Co., Ltd.) | 15 |
| Silica powder as heat resistant agent (Trade name: AERSIL RX200*, manufactured by NIPPON AEROSIL CO., LTD.) | 0.2 |
| Platinum catalyst (Trade name: SIP6832.2, manufactured by Gelest Inc.) | 0.1 |

The metal mold was then heated to vulcanize silicone rubber at a temperature of 50° C. for 15 minutes to be cured. A cured silicone rubber layer was formed on the circumferential surface of the substrate. The substrate was removed from the metal mold, and was further heated at a temperature of 180° C. for 1 hour to complete the curing reaction of the silicone rubber layer. Elastic layer 1 having a silicone rubber elastic layer having a thickness of 0.7 mm and a diameter of 11.4 mm and formed on the outer periphery of the substrate was thus prepared.

Production Example 3

Preparation of Intermediate Layer Roller

The materials for a layer having an irregular surface shown in Table 5 below were mixed.

TABLE 5

| Materials | Parts by mass |
|---|---|
| Polyester polyol (Trade name: NIPPOLAN 3027, manufactured by Tosoh Corporation, Acid value: 1 or less, Hydroxyl value: 43 to 49) | 100 |
| Isocyanate (Trade name: CORONATE 2233, manufactured by Tosoh Corporation) | 120 |

TABLE 5-continued

| Materials | Parts by mass |
|---|---|
| Carbon black (Trade name: MA230, manufactured by Mitsubishi Chemical Corporation) | 33.7 |

Subsequently, methyl ethyl ketone (manufactured by Sigma-Aldrich Corporation was added such that the percentage of the total solid content was 30% by mass, and was homogeneously dispersed with a sand mill. Methyl ethyl ketone was added to the resulting dispersion liquid, and the solid content was adjusted to 25% by mass. In the next step, 15 parts by mass of polyurethane resin particles (trade name: Art-pearl C400, manufactured by Negami Chemical Industrial Co., Ltd.) was added, and was dispersed with stirring with a ball mill to prepare coating material for a layer having an irregular surface. Coating material 1 for a layer having an irregular surface was applied onto the surface of elastic layer 1 by spray coating, and was cured with heating at a temperature of 130° C. for 60 minutes to form layer 1 having an irregular surface (hereinafter, referred to as "intermediate layer roller 1"). The layer having an irregular surface had a thickness of 10 μm.

Production Example 11

Preparation of Hydrolyzed Condensate Intermediate Product C-1

The materials shown in Table 6 below and a stirrer were placed in a 300 mL egg plant flask, and the materials were stirred at room temperature. (25° C.) for 30 minutes. The egg plant flask was then placed in an oil bath, and reflux was performed with heating at 120° C. for 20 hours to perform a first stage reaction. Condensation intermediate product C-1 of the hydrolyzable silane compounds was prepared.

TABLE 6

| Materials | Amount used |
|---|---|
| (First hydrolyzable silane compound) Glycidoxypropyltrimethoxysilane (GPTMS, abbreviated to "EP-1") [Trade name: KBM-403, manufactured by Shin-Etsu Chemical Co., Ltd.] | 11.8 g (0.05 mol) |
| (Second hydrolyzable silane compound Hexyltrimethoxysilane (HEMTMS, abbreviated to "He") [Trade name: KBM-3063 manufactured by Shin-Etsu Chemical Co., Ltd.] | 61.8 g (0.3 mol) |
| Ion-exchanged water | 16.4 g |
| Ethanol (Special grade, manufactured by KISHIDA CHEMICAL Co., Ltd.) | 90.0 g |

Production Examples 12 to 17

Preparation of Hydrolyzed Condensate Intermediate Products C-2 to C-7

Hydrolyzed condensate intermediate products C-2 to C-7 were prepared in the same manner as in preparation of hydrolyzed condensate intermediate product C-1 in Production Example 4 except that the raw materials shown in Table 7 below were used. Symbols in Table 7 are shown in Table 8 below.

TABLE 7

| Production Example | Hydrolyzed condensate intermediate product | EP-1 | EP-2 | EP-3 | EP-4 | He | Ph | Ion-exchanged water | Ethanol |
|---|---|---|---|---|---|---|---|---|---|
| 11 | C-1 | 11.8 | — | — | — | 61.8 | — | 16.4 | 90.0 |
| 12 | C-2 | — | 9.7 | — | — | 61.8 | — | 16.4 | 92.1 |
| 13 | C-3 | — | — | 13.9 | — | 61.8 | — | 16.4 | 87.9 |
| 14 | C-4 | — | — | — | 12.3 | 61.8 | — | 16.4 | 89.5 |
| 15 | C-5 | 11.8 | — | — | — | — | 59.4 | 16.4 | 92.4 |
| 16 | C-6 | 11.8 | — | — | — | 31.4 | 29.7 | 16.4 | 90.7 |
| 17 | C-7 | 9.4 | — | — | — | 61.8 | — | 15.2 | 93.6 |

Unit: g

TABLE 8

| Symbols | Materials |
|---|---|
| EP-1 | 3-Glycidoxypropyltrimethoxysilane (Trade name: KBM-403, manufactured by Shin-Etsu Chemical Co., Ltd.) |
| EP-2 | 4-(Trimethoxysilyl)butane-1,2-epoxide (manufactured by SiKEMIA SAS) |
| EP-3 | (8-Oxiran-2-yl)octyltriethoxysilane (manufactured by SiKEMIA SAS) |
| EP-4 | 2-(3,4-Epoxycyclohexyl)ethyltrimethoxysilane (Trade name: KBM-303, manufactured by Shin-Etsu Chemical Co., Ltd.) |
| He | Hexyltrimethoxysilane (Trade name: KBM-3063, manufactured by Shin-Etsu Chemical Co., Ltd.) |
| Ph | Phenyltriethoxysilane (Trade name: KBM-103, manufactured by Shin-Etsu Chemical Co., Ltd.) |

Production Example 21

Preparation of Hydrolyzed Condensate G-1 for Outermost Layer 22.7 q of aluminum isopropoxide (hydrolyzable aluminum compound, manufactured by TOKYO CHEMICAL INDUSTRY CO., LTD., hereinafter, abbreviated to "A1-1") was added to 57.3 q of condensation intermediate product C-1 returned to room temperature, and was stirred at room temperature for 3 hours. In the next step, a photocationic polymerization initiator was prepared by diluting aromatic sulfonium salt (trade name, Adeka OPTOMER SP-150, manufactured by Adeka Corporation) with methanol such that the concentration was 10% by mass, and was added in an amount of 3.0 parts by mass relative to 100 parts by mass of the solid content of the stirred solution. Subsequently, methanol was further added to prepare hydrolyzed condensate G-1 for an outermost layer having a solid content of 20% by mass. In hydrolyzed condensate G-1 for an outermost, layer, Al/Si=1.0.

Production Examples 22 to 45

Preparation of Hydrolyzed Condensates G-2 to G-25 for Outermost Layer

Hydrolyzed condensates G-2 to G-25 for an outermost layer were prepared in the same manner as in preparation of hydrolyzed condensate G-1 for an outermost layer in Production Example 21 except that the raw materials shown in Table 9 below were used. Symbols in Table 9 are shown in Table 10 below.

TABLE 9

| | | Hydrolyzed condensate intermediate product | | Al-1 | Al-2 | Ti-1 | Sr-1 | Ta-1 | Zr-1 | |
|---|---|---|---|---|---|---|---|---|---|---|
| Production Example | Hydrolyzed condensate | No. | Amount compounded (g) | Amount compounded (g) | Amount compounded (g) | Amount compounded (g) | Amount compounded (g) | Amount compounded (g) | Amount compounded (g) | Al/Si ratio |
| 21 | G-1 | C-1 | 57.3 | 22.7 | 0 | 0 | 0 | 0 | 0 | 1.0 |
| 22 | G-2 | C-1 | 16.1 | 63.9 | 0 | 0 | 0 | 0 | 0 | 0.10 |
| 23 | G-3 | C-1 | 74.1 | 5.9 | 0 | 0 | 0 | 0 | 0 | 5.0 |
| 24 | G-4 | C-1 | 77.5 | 2.5 | 0 | 0 | 0 | 0 | 0 | 12.5 |
| 25 | G-5 | C-1 | 13.4 | 66.6 | 0 | 0 | 0 | 0 | 0 | 0.08 |
| 26 | G-6 | C-1 | 77.8 | 2.2 | 0 | 0 | 0 | 0 | 0 | 14 |
| 27 | G-7 | C-2 | 57.3 | 22.7 | 0 | 0 | 0 | 0 | 0 | 1.0 |
| 28 | G-8 | C-3 | 57.3 | 22.7 | 0 | 0 | 0 | 0 | 0 | 1.0 |
| 29 | G-9 | C-4 | 57.3 | 22.7 | 0 | 0 | 0 | 0 | 0 | 1.0 |
| 30 | G-10 | C-5 | 57.3 | 22.7 | 0 | 0 | 0 | 0 | 0 | 1.0 |
| 31 | G-11 | C-6 | 57.3 | 22.7 | 0 | 0 | 0 | 0 | 0 | 1.0 |
| 32 | G-12 | C-7 | 58.5 | 21.5 | 0 | 0 | 0 | 0 | 0 | 1.0 |
| 33 | G-13 | C-1 | 60.8 | 0 | 19.2 | 0 | 0 | 0 | 0 | 1.0 |
| 34 | G-14 | C-1 | 57.1 | 22.6 | 0 | 0.3 | 0 | 0 | 0 | 1.0 |
| 35 | G-15 | C-1 | 57.1 | 22.7 | 0 | 0 | 1 | 0 | 0 | 1.0 |
| 36 | G-16 | C-1 | 57 | 22.6 | 0 | 0 | 0 | 0 | 0.4 | 1.0 |
| 37 | G-17 | C-1 | 56.8 | 22.5 | 0 | 0 | 0 | 1 | 0.5 | 1.0 |
| 38 | G-18 | C-1 | 80 | 0 | 0 | 0 | 0 | 0 | 0 | 0 |
| 39 | G-19 | — | 0 | 80 | 0 | 0 | 0 | 0 | 0 | — |
| 40 | G-20 | C-1 | 51.5 | 0 | 0 | 28.5 | 0 | 0 | 0 | 0 |

TABLE 9-continued

| | | Hydrolyzed condensate intermediate product | | Al-1 | Al-2 | Ti-1 | Sr-1 | Ta-1 | Zr-1 | |
|---|---|---|---|---|---|---|---|---|---|---|
| Production Example | Hydrolyzed condensate | No. | Amount compounded (g) | Amount compounded (g) | Amount compounded (g) | Amount compounded (g) | Amount compounded (g) | Amount compounded (g) | Amount compounded (g) | Al/Si ratio |
| 41 | G-21 | C-1 | 57.2 | 0 | 0 | 0 | 114 | 0 | 0 | 0 |
| 42 | G-22 | C-1 | 44.7 | 0 | 0 | 0 | 0 | 35.3 | 0 | 0 |
| 43 | G-23 | C-1 | 48.9 | 0 | 0 | 0 | 0 | 0 | 41.5 | 0 |
| 44 | G-24 | C-1 | 36.5 | 0 | 0 | 0 | 73.1 | 28.9 | 0 | 0 |
| 45 | G-25 | C-1 | 28.3 | 0 | 0 | 0 | 56.6 | 22.4 | 24 | 0 |

TABLE 10

| Symbols | Materials |
|---|---|
| Al-1 | Aluminum isopropoxide (manufactured by TOKYO CHEMICAL INDUSTRY CO., LTD.) |
| Al-2 | Aluminum ethoxide (manufactured by Wako Pure Chemical Industries, Ltd.) |
| Ti-1 | Titanium isopropoxide (manufactured by Kojundo Chemical Laboratory Co., Ltd.) |
| Sr-1 | Strontium methoxypropoxide (Trade name: AKS793, manufactured by Gelest Inc., Concentration in methoxypropanol: 20%) |
| Ta-1 | Tantalum pentaethoxide (manufactured by Mitsuwa Chemicals Co., Ltd.) |
| Zr-1 | Zirconium isopropoxide (Trade name: AKZ955, manufactured by Gelest Inc., Concentration in heptane: 75%) |

Example 1

1. Preparation of Developing Member D-1 for Contact Developing Method

Hydrolyzed condensate G-1 for an outermost layer was applied onto the surface of intermediate layer roller 1 by spray coating. The coating was cured (cured through a crosslinking reaction) through irradiation with ultraviolet light having a wavelength of 254 nm such that the accumulated amount of light was 9000 mJ/cm$^2$. An outermost layer was thereby formed. Irradiation with ultraviolet light was performed with a low pressure mercury lamp (manufactured by TOSHIBA LIGHTING & TECHNOLOGY CORPORATION (the former Harison Toshiba Lighting Corporation). The outermost layer had a thickness of 1 μm. Developing member D-1 for a contact developing method was thus prepared.

2. Determination of Structure of Compound in Outermost Layer

It was verified that the compound in the outermost layer had a structural unit represented by Formula (1) and a structural unit represented by Formula (2).

3. Evaluation of Developing Member

Evaluation was performed with a modified laser printer (trade name: LaserJet Pro P1606, manufactured by Hewlett-Packard Company). In the laser printer, the development bias was changed from an AC development bias to DC development bias. The cartridge installed in the as printer was a magnetic non-contact developing apparatus, which was changed to a magnetic contact developing apparatus. A high voltage power supply was separately connected such that the development bias was −500 V, the bright potential on the photosensitive member drum was −300 V, and the dark potential on the photosensitive member drum was −800 V. In other words, the V contrast was 200 V, and the V back was 300 V in this evaluation. In this Example, the developing member for a contact developing method included a laminate of a substrate having an outer diameter of 10 mm and an elastic layer having a thickness of 1.4 mm, and thus had an outer diameter of 11.4 mm. The developing member was brought into contact with the photosensitive member drum. The developing apparatus is a contact developing apparatus provided with an elastic blade as a developer layer thickness regulating member. A magnetic roller was disposed inside the developing member according to this Example.

Developing member D-1 was mounted on a process cartridge, and developer A was filled. This process cartridge was mounted on the laser printer to evaluate images. The image evaluation was performed after printing of 10 sheets (initial stage) and after printing of 2000 sheets (after endurance). Evaluation 1, Evaluation. 2 and Evaluation 3 were performed under a high temperature/high humidity (H/H) environment at a temperature of 32° C, and a relative humidity of 85%. Evaluation 4 on fusing of the developer was also performed. The results of evaluation are show in Table 12.

[Evaluation 1] Amount of Charge

The developer carried on the developing member immediately after printing a white image was collected through suction with a cylindrical metal tube and a cylindrical filter. At this time, the amount of charge Q stored in a capacitor through the cylindrical metal tube and the mass M of the collected developer were measured. From these values, the amount of charge Q/M (mC/kg) per unit mass was calculated.

[Evaluation 2] Proportion of Reversal Developer

In the developer carried on the developing member immediately after printing a white image, the proportion (%) of the number of components (reversal developer) having a reverse charge polarity was determined with a developer charging amount distribution analyzer (E-SPART Analyzer MODEL EST-III ver. 03 (product name), manufactured by Hosokawa Micron Corporation). About 3000 particles were measured under an environment at a temperature of 23° C. and a relative humidity of 50%.

[Evaluation 3] Fogging

Immediately after a white image was printed, a solid white portion corresponding to the circumference of the developing member was printed. The reflectance of the solid white portion was measured at ten places at random. The reflectance of the unused sheet of the transfer paper (average $r_0$ of the reflectances of the ten places of the unused sheet) was subtracted from the lowest value $r_1$ of the ten reflectances of the solid white portion. The value obtained from "$r_1-r_0$" was defined as fogging density. The reflectance was measured with a reflectometer "TC-6DS" (trade name, manufactured by Tokyo Denshoku Co., Ltd.).

[Evaluation 4] Fusing of Developer

After 2000 sheets were printed, the surface of the developing member was cleaned with an air gun. The surface of the developing member was observed by the naked eye and with an ultra-deep profiling microscope (trade name: VK-X100, manufactured by Keyence Corporation) installed with an object lens at a magnification of ×200. The developing member was evaluated based on the degree of contamination by the developer according to the following criteria, and was ranked from A to E.

Rank A: Contamination is hardly observed on the surface of the developing member. No contamination is observed by the naked eye and with the microscope of ×200.

Rank B: Contamination cannot be observed by the naked eye, but slight contamination observed with the microscope of ×200 is partially generated on the surface of the developing member.

Rank C: Contamination cannot be observed by the naked eye, but slight contamination observed with the microscope of ×200 is generated over the surface of the developing member.

Rank D: Fusing clearly visible to the naked eye is partially generated on the surface of the developing member.

Rank E: Fusing clearly visible to the naked eye is generated over the surface of the developing member.

Examples 2 to 17, Comparative Examples 1 to 9

Developing members D-2 to D-17 and d-1 to d-9 for a contact developing method were prepared in the same manner as in Example 1 except that hydrolyzed condensate G-1 for an outermost layer in Example 1 was replaced with hydrolyzed condensates G-2 to G-25 for an outermost layer shown in Table 11. In Comparative Example 1, the hydrolyzed condensate for an outermost layer was not used. The developing members were evaluated for the performance in the same manner as in Example 1. The results of evaluation are shown in Table 12-1 and Table 12-2. In Examples 2 to 17, it was verified that the compound in the outermost layer had a structural unit represented by Formula (1) and a structural unit represented by Formula (2).

TABLE 11

| | | Developing member for contact developing method No. | Hydrolyzed condensate for outermost layer No. |
|---|---|---|---|
| Example | 1 | D-1 | G-1 |
| | 2 | D-2 | G-2 |
| | 3 | D-3 | G-3 |
| | 4 | D-4 | G-4 |
| | 5 | D-5 | G-5 |
| | 6 | D-6 | G-6 |
| | 7 | D-7 | G-7 |
| | 8 | D-8 | G-8 |
| | 9 | D-9 | G-9 |
| | 10 | D-10 | G-10 |
| | 11 | D-11 | G-11 |
| | 12 | D-12 | G-12 |
| | 13 | D-13 | G-13 |
| | 14 | D-14 | G-14 |
| | 15 | D-15 | G-15 |
| | 16 | D-16 | G-16 |
| | 17 | D-17 | G-17 |
| Comparative Example | 1 | d-1 | None |
| | 2 | d-2 | G-18 |
| | 3 | d-3 | G-19 |
| | 4 | d-4 | G-20 |
| | 5 | d-5 | G-21 |
| | 6 | d-6 | G-22 |
| | 7 | d-7 | G-23 |
| | 8 | d-8 | G-24 |
| | 9 | d-9 | G-25 |

TABLE 12-1

| | | | Q/M (mC/kg) | | Proportion of reversal developer (%) | | Fogging (%) | | Rank in evaluation of |
|---|---|---|---|---|---|---|---|---|---|
| | | Developing member No. | Initial stage | After endurance | Initial stage | After endurance | Initial stage | After endurance | fusing of developer After endurance |
| Example | 1 | D-1 | 8.5 | 9.7 | 5.1 | 4.2 | 2.1 | 1.5 | A |
| | 2 | D-2 | 7.4 | 8.6 | 6.2 | 5.2 | 4.2 | 3.5 | A |
| | 3 | D-3 | 8.4 | 9.6 | 5.3 | 4.4 | 2.3 | 1.6 | A |
| | 4 | D-4 | 9.5 | 10.6 | 4.5 | 3.8 | 1.8 | 1.5 | B |
| | 5 | D-5 | 6.8 | 7.5 | 7.2 | 5.6 | 6.2 | 5.5 | A |
| | 6 | D-6 | 9.9 | 11 | 4.3 | 3.6 | 1.8 | 1.6 | C |
| | 7 | D-7 | 8.3 | 9.7 | 5.2 | 4.7 | 2.3 | 1.8 | A |
| | 8 | D-8 | 8.5 | 9.8 | 5.3 | 4.3 | 2.4 | 1.6 | A |
| | 9 | D-9 | 8.4 | 9.6 | 5.1 | 4.1 | 2.2 | 1.7 | A |
| | 10 | D-10 | 8.6 | 9.8 | 5.3 | 4.1 | 2.5 | 1.9 | A |
| | 11 | D-11 | 8.4 | 9.4 | 5.2 | 4.3 | 2.3 | 1.6 | A |
| | 12 | D-12 | 7.4 | 8.6 | 6.3 | 5.2 | 3.8 | 3.5 | A |
| | 13 | D-13 | 8.2 | 9.6 | 5.2 | 4.4 | 2.2 | 1.9 | A |
| | 14 | D-14 | 8.6 | 9.7 | 5.3 | 4.6 | 2.3 | 1.8 | A |
| | 15 | D-15 | 8.3 | 9.8 | 5.4 | 4.4 | 2.4 | 1.8 | A |
| | 16 | D-16 | 8.5 | 9.8 | 5.2 | 4.3 | 2.2 | 1.6 | A |
| | 17 | D-17 | 8.6 | 9.9 | 5.3 | 4.3 | 2.5 | 1.7 | A |

TABLE 12-2

| | | | Q/M (mC/kg) | | Proportion of reversal developer (%) | | Fogging (%) | | Rank in evaluation of |
|---|---|---|---|---|---|---|---|---|---|
| | | Developing member No. | Initial stage | After endurance | Initial stage | After endurance | Initial stage | After endurance | fusing of developer After endurance |
| Comparative | 1 | d-1 | 4.5 | 4.8 | 12.6 | 11.8 | 22.3 | 21.5 | E |
| Example | 2 | d-2 | 4.3 | 4.6 | 12.7 | 11.6 | 21.3 | 20.5 | A |
| | 3 | d-3 | 14.5 | 4.2 | 3.2 | 11.6 | 2.5 | 23.2 | E |
| | 4 | d-4 | 4.2 | 5.6 | 10.2 | 9.6 | 15.2 | 12.5 | A |
| | 5 | d-5 | 4.3 | 5.5 | 10.6 | 9.4 | 15.6 | 13.4 | A |
| | 6 | d-6 | 4.7 | 5.8 | 10.6 | 9.8 | 16.2 | 12.5 | A |
| | 7 | d-7 | 4.4 | 5.6 | 10.2 | 9.5 | 16.1 | 12.6 | A |
| | 8 | d-8 | 4.4 | 5.6 | 10.3 | 9.6 | 15.9 | 13.2 | A |
| | 9 | d-9 | 4.5 | 5.8 | 10.6 | 9.6 | 15.8 | 12.8 | A |

[Review 1 on Results of Evaluation]

The developing members in Examples 1 to 17 had good results. The developing member in Comparative Example 1 did not include the outermost layer. For this reason, the charging properties were not sufficient, and a here number of reversal developers were generated. The developing member in Comparative Example 1 had insufficient durability. As a result, fogging was significantly generated, and the developer was remarkably fused. In the developing member in Comparative Example 2, no aluminum element was present in the compound in the outermost layer. For this reason, the charging properties were not sufficient, a large number of reversal developers were generated, and fogging was significantly generated. In the developing member in Comparative. Example 3, the organosiloxane structure was not present in the compound in the outermost layer. For this reason, the developing member had insufficient durability. Fogging after endurance was significantly generated, and the developer was remarkably fused. In the developing members in Comparative Examples 4 to 9, no aluminum element was present in the compound in the outermost layer. For this reason, the charging properties were not sufficient, a large number of reversal developers were generated, and fogging was significantly generated.

Example 21

1. Preparation of Developing Member S-1 for Non-Contact Developing Method

Polyurethane resin particles (trade name: Art-pearl C400, manufactured by Negami Chemical Industrial Co., Ltd.) were added in an amount of 15 parts by mass relative to 100 parts by mass of the solid content of hydrolyzed condensate G-1, and methanol was further added to adjust the solid content to 30% by mass. These materials were then homogeneously dispersed with a sand mill. The resulting solution was applied by spray coating onto the surface of a cylindrical aluminum tube ground into an outer diameter of 10 mm, a length of 250 mm, and an arithmetic average roughness Ra of 0.2 μm. The coating was cured (cured through a cross-linking reaction) through irradiation with ultraviolet light having a wavelength of 254 nm such that the accumulated amount of light was 9000 mJ/$cm^2$. An outermost layer was thereby formed. Irradiation with ultraviolet light was performed with a low pressure mercury lamp (manufactured by TOSHIBA LIGHTING & TECHNOLOGY CORPORATION (the former Harison Toshiba Lighting Corporation). The outermost layer had a thickness of 6 μm. Developing member S-1 for a non-contact developing method was thus prepared.

2. Determination of Structure of Compound in Outermost Layer

It was verified that the compound in the outermost layer had a structural unit represented by Formula (1) and a structural unit represented by Formula (2).

3. Evaluation of Developing Member

Evaluation was performed with a laser printer (trade name: LaserJet Pro P1606, manufactured by Hewlett-Packard Company). A magnetic roller was disposed inside the developing member according to this Example. Developing member S-1 for a non-contact developing method was mounted on the process cartridge, and developer A was filled. The process cartridge was mounted on the laser printer to evaluate images in the same manner as in Example 1. The results of evaluation are shown in Table 14.

Examples 22 to 24, Comparative Examples 11 and 12

Developing members S-2 to S-4, s-11 and s-12 for a non-contact developing method were prepared in the same manner as in Example 21 except that hydrolyzed condensate G-1 for an outermost layer in Example 21 was replaced with hydrolyzed condensates G-2 to G-4, G-18 or G-19 for an outermost layer shown in Table 13. The developing members were evaluated for the performance in the same manner as in Example 21. The results of evaluation are shown in Table 14. In Examples 22 to 24, it was verified that the compound in the outermost layer bad a structural unit represented by Formula (1) and a structural unit represented by Formula (2).

TABLE 13

| | Developing member for non-contact developing method No. | Hydrolyzed condensate for outermost layer No. |
|---|---|---|
| Example 21 | S-1 | G-1 |
| Example 22 | S-2 | G-2 |
| Example 23 | S-3 | G-3 |
| Example 24 | S-4 | G-4 |
| Comparative Example 11 | s-1 | G-18 |
| Comparative Example 12 | s-1 | G-19 |

TABLE 14

| | | Developing member No. | Q/M (mC/kg) Initial stage | After endurance | Proportion of reversal developer (%) Initial stage | After endurance | Fogging (%) Initial stage | After endurance | Rank in evaluation of fusing of developer After endurance |
|---|---|---|---|---|---|---|---|---|---|
| Example | 21 | S-1 | 8.3 | 9.5 | 5.2 | 4.3 | 2.3 | 1.6 | A |
| | 22 | S-2 | 7.2 | 8.6 | 6.1 | 5.3 | 4.4 | 3.6 | A |
| | 23 | S-3 | 8.2 | 9.3 | 5.4 | 4.6 | 2.2 | 1.7 | A |
| | 24 | S-4 | 9.3 | 10.2 | 4.4 | 3.6 | 1.7 | 1.4 | B |
| Comparative | 11 | s-1 | 4.2 | 4.6 | 12.4 | 11.6 | 23.5 | 20.6 | E |
| Example | 12 | s-2 | 4.4 | 4.7 | 12.2 | 11.5 | 21.7 | 20.6 | A |

[Review 2 on Results of Evaluation]

The developing members in Examples, 21 to 24 had good result. In the developing member in Comparative Example 11, no aluminum element was present in the compound in the outermost layer. For this reason, the charging properties were not sufficient, a large number of reversal developers were generated, and fogging was significantly generated. In the developing member in Comparative Example 12, the organosiloxane structure was not present in the compound in the outermost layer. For this reason, the developing member had insufficient durability. Fogging after endurance was significantly generated, and the developer was remarkably fused.

Example 31

1. Preparation of Charging Member A-1

The materials shown in Table 15 below were kneaded in a 6 L pressure kneader (apparatus used: TD6-15MDX, manufactured by Toshin Co., Ltd.) for 20 minutes. 4.5 parts mass of a vulcanization accelerator tetrabenzyithiuram sulfide (trade name: Sanceler TBzTD, manufactured by Sanshin Chemical Industry Co., Ltd.) and 1.2 parts by mass of a vulcanizing agent sulfur were added, and were further kneaded with an open roll mill having a roll diameter of 12 inches for 8 minutes to prepare unvulcanized rubber.

TABLE 15

| Raw materials | Amount used (parts by mass) |
|---|---|
| Medium-high nitrile (Trade name: Nipol DN219, manufactured by ZEON Corporation) | 100 |
| Coloring carbon black (Trade name: #7360, manufactured by Tokai Carbon Co., Ltd.) | 48 |
| Calcium carbonate (Trade name: NANOX #30, manufactured by Maruo Calcium Co., Ltd.) | 20 |
| Zinc oxide (Trade name: Two zinc oxides, manufactured by SAKAI CHEMICAL INDUSTRY CO., LTD.) | 5 |
| Stearic acid (Trade name: Zinc stearate, manufactured by NOF CORPORATION) | 1 |

Next, a thermosetting adhesive containing metal and rubber (trade name: METALOC N-33, manufactured by Toyokagaku Kenkyusho, Co., Ltd.) was applied onto a cylindrical steel support having a diameter of 6 mm and a length of 252 mm (having a nickel-plated surface) in a region ranging 115.5 mm from the center of the axis direction of the cylindrical surface toward each end (region ranging 231 mm in total in the axis direction width) The coating was dried at a temperature of 80° C. for 30 minutes, and was then further dried at a temperature of 120° C. for 1 hour.

Next, using a crosshead extruder, an unvulcanized rubber composition was coaxially extruded onto the support having the adhesive layer into a cylindrical shape having an outer diameter of 8.75 to 8.90 mm. The ends thereof were cut off to form a layer (length: 242 mm) of the unvulcanized rubber composition on the outer periphery of the support. The extruder used had a cylinder diameter of 70 mm and L/D=20. The temperature conditions during extrusion were as follows: the head temperature was 90° C., the cylinder temperature was 90° C., and the screw temperature was 90° C.

Next, the roller provided with the unvulcanized rubber layer was placed in a continuous heating furnace including two zones set at different temperatures. The first zone was set at a temperature of 90° C., and the roller passed through the first zone in 30 minutes. The second one was set at a temperature 100° C., and the roller passed through the second zone in 30 minutes. The layer of the unvulcanized rubber composition was thereby vulcanized to form an elastic layer. Next, both ends of the elastic layer were cut off to adjust the width of the elastic layer in the axis direction to 232 mm. Subsequently, the surface of the elastic layer was ground with a rotary grinding wheel to prepare elastic roller 1 having a crown shape having an end diameter of 8.26 mm and a central diameter of 8.50 mm.

Next, hydrolyzed condensate G-1 for an outermost layer diluted with a mixed solvent of ethanol:2-butanol=1:1 (mass ratio) such that the solid content was 1.0% by mass was applied by ring coating onto the outer periphery of the elastic layer in elastic roller 1. The coating was cured (cured through a crosslinking reaction) through irradiation with ultraviolet light having a wavelength of 254 nm such that the accumulated amount of light was 9000 mJ/cm$^2$. An outermost layer was thereby formed. Irradiation with ultraviolet light was performed with a low pressure mercury lamp (manufactured by TOSHIBA LIGHTING & TECHNOLOGY CORPORATION (the former Harison Toshiba Lighting Corporation)). Charging member A-1 was thus prepared.

2. Determination of Structure of Compound in Outermost Layer

It was verified that the compound in the outermost layer had a structural unit represented by Formula (1) and a structural unit represented by Formula (2).

3. Evaluation of Charging Member

Evaluation was performed with a laser printer (trade name: LaserJet Pro P1606 manufactured by Hewlett-Packard Company). Charging member A-1 was mounted on the original CRG (manufactured by Hewlett-Packard Company, process cartridge). The cleaning blade was dismounted. Developer A was filled. This process cartridge was mounted on the laser printer to evaluate images under a high temperature/high humidity (H/H) environment, at temperature of 32° C. and a relative humidity of 85%. Evaluation 5 was performed after printing of 2000 sheets (after endurance) as follows. Evaluation 6 on images was performed after printing of 10 sheets (initial stage) and after printing of 2000 sheets (after endurance) as follows. The results of evaluation are shown in Table 17.

[Evaluation 5] Fusing of Developer

After 2000 sheets were printed, the surface of the charging member was cleaned with an air gun. The surface of the charging member was observed by the naked eye and with an ultra-deep profiling microscope (trade name: VK-X100, manufactured by Keyence Corporation) installed with an object lens at a magnification of ×200. The charging member was evaluated based on the degree of contamination by the developer according to the following criteria, and was ranked from A to E.

Rank A: Contamination is hardly observed on the surface of the charging member. No contamination is observed by the naked eye and with the microscope of ×200.

Rank B: Contamination cannot be observed by the naked eve, but slight contamination observed with the microscope of ×200 is partially generated on the surface of the charging member.

Rank C: Contamination cannot be observed by the naked eye, but slight contamination observed with the microscope of ×200 is generated over the surface of the charging member.

Rank D: Fusing clearly visible to the naked eye is partially generated on the surface of the charging member.

Rank E: Fusing clearly visible to the naked eye is generated over the surface of the charging member.

[Evaluation 6] Recovering Properties of Developer 1.0 g of an uncharged developer was applied onto the surface of the charging member, and the charging member was integrated into the original CRG (process cartridge). In this state, a white image was printed on 10 sheets. Subsequently, the charging member was extracted. The amount of the residual developer on the charging member was measured, and was evaluated according to the following criteria to rank the result from A to D. The charging member after endurance was cleaned with an air gun, and the main evaluation thereof was performed.

Rank A: less than. 0.1 g

Rank B: 0.1 g or more and less than 0.3 g

Rank C: 0.3 g or more and less than 0.5 g

Rank D: 0.5 g or more.

Examples 32 to 34, Comparative Examples 21 and 22

Charging members A-2 to A-4, a-1 and a-2 were prepared in the same manner as in Example 31 except that hydrolyzed condensate G-1 for an outermost layer used in preparation of the charging member in Example 31 was replaced with hydrolyzed condensates G-2 to G-4, G-13 and G-19 for an outermost layer shown in Table 16 below, respectively. Evaluation was performed in the same manner as in Example 31. The results of evaluation are shown in Table 17. In Examples 32 to 34, it was verified that the compound in the outermost layer had a structural unit represented by Formula (1) and a structural unit represented by Formula (2).

TABLE 16

| | Charging member | Hydrolyzed condensate for outermost layer |
|---|---|---|
| Example 31 | A-1 | G-1 |
| Example 32 | A-2 | G-2 |
| Example 33 | A-3 | G-3 |
| Example 34 | A-4 | G-4 |
| Comparative Example 21 | a-1 | G-18 |
| Comparative Example 22 | a-2 | G-19 |

TABLE 17

| | Charging member | Recovering properties of developer | | Fusing of developer |
|---|---|---|---|---|
| | | Initial stage | After endurance | After endurance |
| Example 31 | A-1 | A | A | A |
| Example 32 | A-2 | A | A | A |
| Example 33 | A-3 | A | A | A |
| Example 34 | A-4 | A | A | A |
| Comparative Example 21 | a-1 | D | D | D |
| Comparative Example 22 | a-2 | C | D | E |

[Review 3 on Results of Evaluation]

The charging members in Example 31 to 34 had good results. In the charging member in Comparative Example 21, no aluminum element was present in the compound in the outermost layer. For this reason, the charging properties were not sufficient, and the reversal developer was not sufficiently recovered to the developing unit. As a result, the developer was fused. In the charging member in Comparative Example 22, the organosiloxane structure was riot present in the compound in the outermost layer. For this reason, durability was not sufficient, the recovering properties of the developer after endurance were not sufficient, and the developer was remarkably fused.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-138018, filed. Jul. 9, 2015, which is hereby incorporated by reference herein in its entirety.

What is claimed is:

1. An electrophotographic member comprising:

a substrate; and an outermost layer directly or indirectly disposed on the substrate, wherein, the outermost layer comprises a compound having at least a Si—O—Al bond, and the compound has a structural unit represented by Formula (1), and a structural unit represented by Formula (2):

Formula (1)

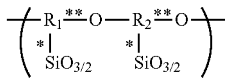

Formula (2)

$AlO_{3/2}$ where $R_1$ and $R_2$ each independently represent one of Formulae (3) to (6):

Formula (3)

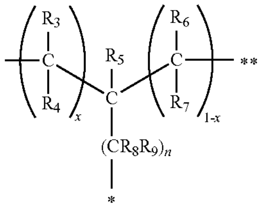

Formula (4)

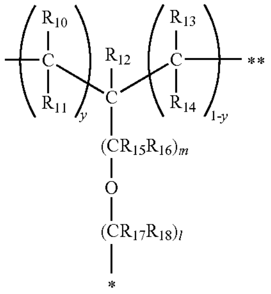

Formula (5)

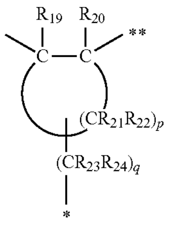

Formula (6)

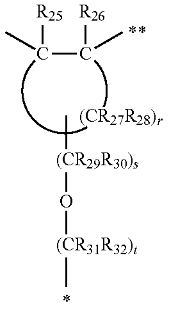

where $R_3$ to $R_7$, $R_{10}$ to $R_{14}$, $R_{19}$, $R_{20}$, $R_{25}$ and $R_{26}$ each independently represent hydrogen, an alkyl group having 1 to 4 carbon atoms, a hydroxyl group, a carboxyl group, or an amino group; $R_8$, $R_9$, $R_{15}$ to $R_{18}$, $R_{23}$, $R_{24}$ and $R_{29}$ to $R_{32}$ each independently represent hydrogen or an alkyl group having 1 to 4 carbon atoms; $R_{21}$, $R_{22}$, $R_{27}$ and $R_{28}$ each independently represent hydrogen, an alkoxyl group having 1 to 4 carbon atoms, or an alkyl group having 1 to 4 carbon atoms; n, m, l, q, s and t each independently represent an integer of 1 or more and 8 or less; p and r each independently represent an integer of 4 or more and 12 or less; x and y each independently represent 0 or 1; and * and ** represent a position of bonding to a silicon atom and a position of bonding to an oxygen atom in Formula (1), respectively.

2. The electrophotographic member according to claim 1, wherein an atomic ratio Al/Si of aluminum to silicon in the compound is 0.10 or more and 12.5 or less.

3. The electrophotographic member according to claim 1, wherein the electrophotographic member is a developing member.

4. The electrophotographic member according to claim 1, wherein the electrophotographic member is a charging member.

5. A developing apparatus comprising a developing member, wherein the developing member comprises a substrate, and an outermost layer directly or indirectly disposed on the substrate, and wherein the outermost layer comprises a compound having at least a Si—O—Al bond, and the compound has:

a structural unit represented by Formula (1); and a structural unit represented by Formula (2):

Formula (1)

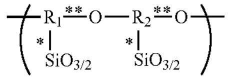

Formula (2)

$AlO_{3/2}$ where $R_1$ and $R_2$ each independently represent one of Formulae (3) to (6):

Formula (3)

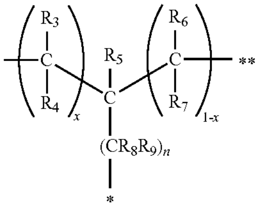

Formula (4)

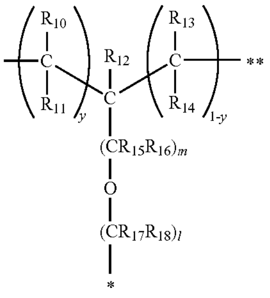

Formula (5)

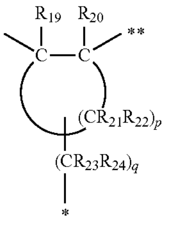

-continued

Formula (6)

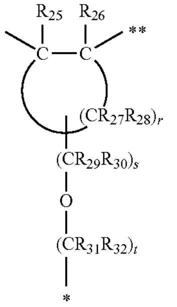

where $R_3$ to $R_7$, $R_{13}$ to $R_{14}$, $R_{19}$, $R_{20}$, $R_{25}$ and $R_{26}$ each independently represent hydrogen, an alkyl group having 1 to 4 carbon atoms, a hydroxy group, a carboxyl group, or an amino group; $R^8$, $R_9$, $R^{15}$ to $R_{18}$, $R^{23}$, $R^{24}$ and $R^{29}$ to $R^{32}$ each independently represent hydrogen or an alkyl group having 1 to 4 carbon atoms; $R_{21}$, $R_{22}$, $R_{27}$ and $R_{28}$ each independently represent hydrogen, an alkoxyl group having 1 to 4 carbon atoms, or an alkyl group having 1 to 4 carbon atoms; n, m, l, q, s and t each independently represent an integer of 1 or more and 8 or less; p and r each independently represent an integer of 4 or more and 12 or less; x and y each independently represent 0 or 1; and * and ** represent a position of bonding to a silicon atom and a position of bonding to an oxygen atom in Formula (1), respectively.

6. An image forming apparatus comprising a developing apparatus, wherein the developing apparatus comprises a developing member, the developing member comprises a substrate, and an outermost layer directly or indirectly disposed on the substrate, and wherein the outermost layer comprises a compound having at least a Si—O—Al bond, and the compound has:

a structural unit represented by Formula (1); and a structural unit represented by Formula (2):

Formula (1)

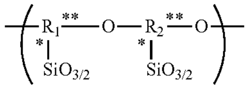

Formula (2)

$AlO_{3/2}$ where $R_1$ and $R_2$ each independently represent one of Formulae (3) to (6):

Formula (3)

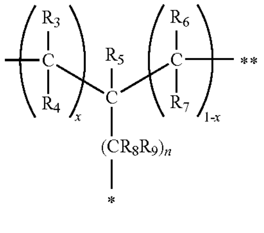

-continued

Formula (4)

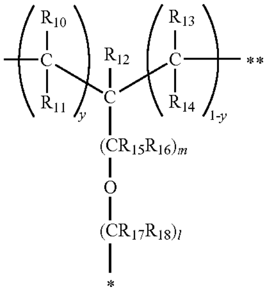

Formula (5)

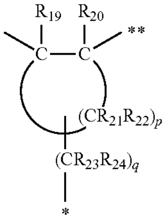

Formula (6)

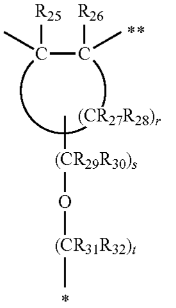

where $R_3$ to $R_8$, $R_{10}$ to $R_{14}$, $R_{19}$, $R_{20}$, $R_{25}$ and $R_{26}$ each independently represent hydrogen, an alkyl group having 1 to 4 carbon atoms, a hydroxyl group, a carboxyl group, or an amino group; $R_8$, $R_9$, $R_{15}$ to $R_{18}$, $R_{23}$, $R_{24}$ and $R_{29}$ to $R_{32}$ each independently represent hydrogen or an alkyl group having 1 to 4 carbon atoms; $R_{21}$, $R_{22}$, $R_{27}$ and $R_{28}$ each independently represent hydrogen, an alkoxyl group having 1 to 4 carbon atoms, or an alkyl group having 1 to 4 carbon atoms; n, m, l, q, s and t each independently represent an integer of 1 or more and 8 or less; p and r each independently represent an integer of 4 or more and 12 or less; x and y each independently represent 0 or 1; and * and * * represent a position of bonding to a silicon atom and a position of bonding to an oxygen atom in Formula (1), respectively.

* * * * *